United States Patent
Winn et al.

(10) Patent No.: US 12,497,349 B2
(45) Date of Patent: Dec. 16, 2025

(54) SALTS OF TRANEXAMIC ACID ESTERS

(71) Applicant: Actera Ingredients, Inc., Newtown, PA (US)

(72) Inventors: Daniel Winn, Kingston, NJ (US); Ivan Domicio da Silva Souza, Philadelphia, PA (US)

(73) Assignee: Actera Ingredients, Inc., Newtown, PA (US)

( * ) Notice: Subject to any disclaimer, the term of this patent is extended or adjusted under 35 U.S.C. 154(b) by 888 days.

(21) Appl. No.: 17/776,802

(22) PCT Filed: Nov. 18, 2019

(86) PCT No.: PCT/US2019/062022
§ 371 (c)(1),
(2) Date: May 13, 2022

(87) PCT Pub. No.: WO2021/101508
PCT Pub. Date: May 27, 2021

(65) Prior Publication Data
US 2022/0402864 A1 Dec. 22, 2022

(51) Int. Cl.
| | | |
|---|---|---|
| *C07C 229/46* | (2006.01) | |
| *A61K 8/41* | (2006.01) | |
| *A61Q 19/00* | (2006.01) | |
| *C07C 227/18* | (2006.01) | |

(52) U.S. Cl.
CPC ............ *C07C 229/46* (2013.01); *A61K 8/416* (2013.01); *A61Q 19/00* (2013.01); *C07C 227/18* (2013.01); *C07C 2601/14* (2017.05)

(58) Field of Classification Search
CPC . C07C 229/46; C07C 227/18; C07C 2601/14; A61K 8/416; A61Q 19/00
See application file for complete search history.

(56) References Cited

U.S. PATENT DOCUMENTS

| | | | |
|---|---|---|---|
| 8,647,650 B2 | 2/2014 | Miyamoto et al. | |
| 9,345,651 B2 | 5/2016 | Kuromiya et al. | |
| 2008/0280981 A1* | 11/2008 | Moore | A61P 1/08 514/561 |
| 2011/0060040 A1* | 3/2011 | Virsik | A61P 7/04 514/484 |
| 2012/0244204 A1* | 9/2012 | Miyamoto | A61K 8/044 514/429 |

FOREIGN PATENT DOCUMENTS

| | | |
|---|---|---|
| JP | S42-11059 B | 6/1967 |
| JP | H0446144 A | 2/1992 |
| JP | 2003306419 A | 10/2003 |
| WO | 2006114338 A1 | 11/2006 |
| WO | 2008050173 A1 | 5/2008 |
| WO | 2015104721 A2 | 7/2015 |

OTHER PUBLICATIONS

Ando, H., et al., "Quasi-Drugs Developed in Japan for Prevention or Treatment of Hyperpigmentary Disorders," 2010, Int J Mol, 11/7:2566-2575, 10 pages.
Elder, D. P. et al., "The Utility of Sulfonate Salts in Drug Development", Journal of Pharmaceutical Sciences, 2010, vol. 99, pp. 2948-2961, 14 pages.
Hiramoto, K. et al., "The amelioration effect of tranexamic acid in wrinkles induced by skin dryness", Biomedicine & Pharmacotherapy, 2016, vol. 80, pp. 16-22, Abstract Only.
Kim, S. J. et al., "Efficacy and possible mechanisms of topical tranexamic acid in melasma", Clinical and Experimental Dermatology, 2016, vol. 41, pp. 480-485, Abstract Only.
Lee, D. H. et al., "Reduction in facial hyperpigmentation after treatment with a combination of topical niacinamide and tranexamic acid: a randomized, double-blind, vehicle-controlled trial", Skin Research and Technology, 2014, vol. 20, pp. 208-212, Abstract Only.
International Preliminary Report on Patentability issued in PCT/US2019/062022, dated Jun. 2, 2022, 7 pages.
International Search Report and Written Opinion issued in PCT/US2019/062022, dated Aug. 11, 2020, 11 pages.

* cited by examiner

*Primary Examiner* — Jeffrey S Lundgren
*Assistant Examiner* — Ibrahim D Bori
(74) *Attorney, Agent, or Firm* — Stinson LLP

(57) ABSTRACT

Various salts of tranexamic acid esters compounds are described, along with compositions including such compounds. Methods of use for treatment of external surfaces (e.g. skin) and processes of producing the compounds and compositions are also described.

20 Claims, 2 Drawing Sheets

Example 3

Example 4

Example 5

Example 6

SALTS OF TRANEXAMIC ACID ESTERS

FIELD OF THE INVENTION

The present invention relates to various salts of tranexamic acid esters, and compositions including such compounds. The present invention also includes methods of using these compounds and compositions, such as for treating external surfaces (e.g. skin), of a subject, as well as processes of producing the compounds and compositions.

BACKGROUND

Various salts of tranexamic acid esters have been used for treating external skin conditions such as melasma, UV-induced hyperpigmentation, redness, age spots, moles, and darkened wrinkles. See for example, Japanese Patent Application Publication H04-46144, which describes discloses a composition for external use containing a tranexamate ester hydrochloride salt as an anti-pigmentation agent. Despite the usefulness of tranexamate ester salts in external compositions, a common technical problem emerges because various salts of tranexamic acid ester are only sparingly soluble in water or oil, and difficult to disperse in either. Poor solubility can result crystallization and aggregation in cosmetic compositions, subsequently leading to product instability and poor texture and feel.

Complex compositions containing certain salts of tranexamic acid esters have been developed to overcome the poor stability and to create improved skin feel. For example, U.S. Pat. No. 9,345,651 describes complex emulsions where the oil phase comprises a combination of a tranexamate ester hydrochloride salt and an amphiphilic substance that stabilizes the salt with the oil phase. The oil phase also includes water. The oil phase is dispersed within a larger water phase. Therefore, these complex compositions can be considered three phase emulsions (i.e., a water-in-oil-in-water emulsion. U.S. Pat. No. 9,833,401 discloses a dispersion of a tranexamate ester hydrochloride salt with an amphiphilic polymer (i.e., 2-methacryloyloxyethyl phosphorylcholine/stearyl methacrylate copolymer). Also, U.S. Pat. No. 8,647,650 describes a method for producing a dispersion of tranexamate ester hydrochloride salt by using a salting out agent to create microscopic particles of less than 100 microns. The method comprises multiple steps, starting with the dissolution of a tranexamate ester hydrochloride salt in a solvent, and followed by its precipitation to micrometric particles aided by a salting-out agent.

These compositions require various multi-step processes or various secondary materials in order to create stable formulations tranexamate ester hydrochloride salt. Multi-step processes and secondary materials necessarily add costs when preparing these compositions. Also, the secondary materials are typically petrochemical derived polymers, which are frequently disliked by consumers seeking more natural and simple personal care products.

Thus, there remains a need for salts of tranexamic acid esters that readily form stable and/or homogeneous aqueous dispersions without requiring additional processing steps and without requiring secondary materials to stabilize the salt. There also remains a need for stable and effective compositions that include salts of tranexamic acid esters, and for methods using and processes producing such compounds and compositions.

BRIEF SUMMARY OF THE INVENTION

Various aspects of the present invention are directed to certain salts of tranexamic acid esters. In various embodiments, the salts of tranexamic acid esters are compounds of formula (I):

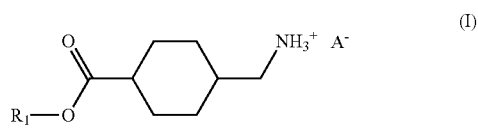

wherein $R_1$ is a saturated or unsaturated, substituted or unsubstituted aliphatic hydrocarbyl and $A^-$ is a counter-ion having a sulfonic acid moiety.

Additional aspects of the present invention include compositions comprising one or more salts of tranexamic acid esters (e.g., a compound of formula (I) as shown above and described herein), and water.

Further aspects include methods for treating an external surface of a subject. In various embodiments, the methods comprise applying to an external surface of the subject an effective amount of (a) a compound of formula (I), as shown above and described herein, or (b) a composition comprising a compound of formula (I) and water.

Still further aspects include processes for producing a composition comprising a compound of formula (I), as shown above and described herein, and water. In various embodiments, the processes comprise combining the water with the compound of formula (I).

Other aspects include processes for synthesizing the compounds of formula (I), as shown above and described herein. In various embodiments, the processes comprises contacting tranexamic acid with an alcohol comprising the moiety of $R^1$ and a sulfonic acid comprising the ion of $A^-$ to form the compound.

Other objects and features will be in part apparent and in part pointed out hereinafter.

DETAILED DESCRIPTION OF THE INVENTION

Figure 1:
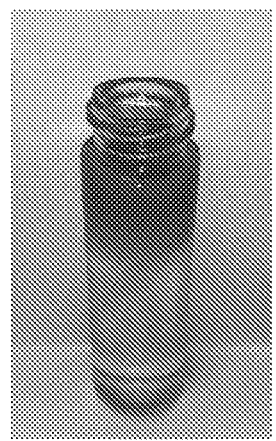
FIG. 1 presents a series of images of compositions containing different salts of tranexamic acid esters.
Figure 1:
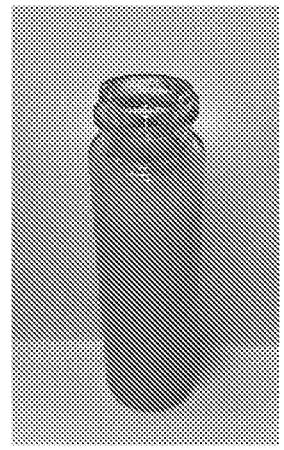
Figure 1:
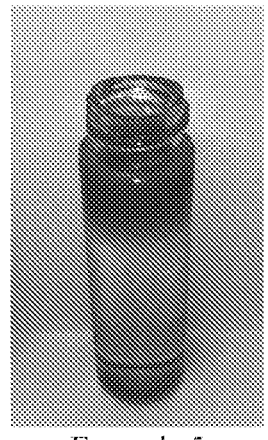
Figure 1:
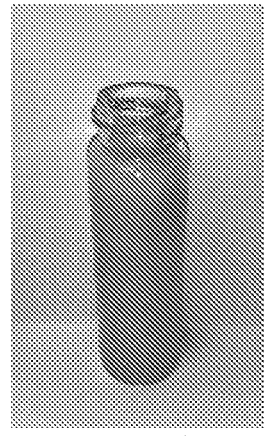

Various compounds, compositions, and associated methods for treating external surfaces (e.g. skin) of a subject are described herein. Processes for producing the compounds and compositions are also described herein. Applicants have found that the compounds of the present invention can provide for surprisingly stable and/or homogeneous compositions that do not form aggregates or precipitate crystals. Various compositions exhibit a smooth and refreshing feeling of use, and have a texture free from unfavorable grainy, sticky, or oily feel or after-feel.

Salts of Tranexamic Acid Esters

Various aspects of the present invention are directed to salts of tranexamic acid esters. In various embodiments, the salts of tranexamic acid esters are compounds of formula (I):

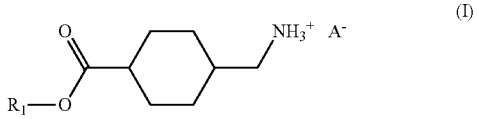

(I)

wherein $R_1$ is a saturated or unsaturated, substituted or unsubstituted aliphatic hydrocarbyl and $A^-$ is a counter-ion having a sulfonic acid moiety.

In various embodiments, $R_1$ is a saturated or unsaturated, aliphatic hydrocarbyl substituted with one or more alkyl, alkenyl, hydroxyl, oxo, alkoxy, and/or cycloalkyl moieties.

In various embodiments, $R_1$ is alkyl. In certain embodiments, $R_1$ is a $C_1$ to $C_{22}$, $C_2$ to $C_{22}$, $C_3$ to $C_{22}$, $C_4$ to $C_{22}$, $C_8$ to $C_{22}$, $C_8$ to $C_{20}$, $C_8$ to $C_{18}$, $C_8$ to $C_{16}$, $C_8$ to $C_{14}$, $C_8$ to $C_{12}$, $C_8$ to $C_{10}$, $C_{10}$ to $C_{22}$, $C_{10}$ to $C_{20}$, $C_{10}$ to $C_{18}$, $C_{10}$ to $C_{16}$, $C_{10}$ to $C_{14}$, $C_{10}$ to $C_{12}$, $C_{12}$ to $C_{22}$, $C_{12}$ to $C_{20}$, $C_{12}$ to $C_{18}$, $C_{12}$ to $C_{16}$, $C_{12}$ to $C_{14}$, $C_{14}$ to $C_{22}$, $C_{14}$ to $C_{20}$, $C_{14}$ to $C_{18}$, $C_{14}$ to $C_{16}$, $C_{16}$ to $C_{22}$, $C_{16}$ to $C_{20}$, $C_{16}$ to $C_{18}$, $C_{18}$ to $C_{22}$, $C_{18}$ to $C_{20}$, or $C_{20}$ to $C_{22}$ alkyl. For example, in certain embodiments, $R_1$ is a $C_8$ to $C_{22}$ alkyl. In further embodiments, $R_1$ is a linear $C_{12}$, $C_{14}$, $C_{16}$, or $C_{18}$ alkyl.

In various embodiments, $R_1$ is alkenyl. In certain embodiments, $R_1$ is a $C_1$ to $C_{22}$, $C_2$ to $C_{22}$, $C_3$ to $C_{22}$, $C_4$ to $C_{22}$, $C_8$ to $C_{22}$, $C_8$ to $C_{20}$, $C_8$ to $C_{18}$, $C_8$ to $C_{16}$, $C_8$ to $C_{14}$, $C_8$ to $C_{12}$, $C_8$ to $C_{10}$, $C_{10}$ to $C_{22}$, $C_{10}$ to $C_{20}$, $C_{10}$ to $C_{18}$, $C_{10}$ to $C_{16}$, $C_{10}$ to $C_{14}$, $C_{10}$ to $C_{12}$, $C_{12}$ to $C_{22}$, $C_{12}$ to $C_{20}$, $C_{12}$ to $C_{18}$, $C_{12}$ to $C_{16}$, $C_{12}$ to $C_{14}$, $C_{14}$ to $C_{22}$, $C_{14}$ to $C_{20}$, $C_{14}$ to $C_{18}$, $C_{14}$ to $C_{16}$, $C_{16}$ to $C_{22}$, $C_{16}$ to $C_{20}$, $C_{16}$ to $C_{18}$, $C_{18}$ to $C_{22}$, $C_{18}$ to $C_{20}$, or $C_{20}$ to $C_{22}$ alkenyl. For example, in certain embodiments, $R_1$ is a $C_8$ to $C_{22}$ alkenyl. In further embodiments, $R_1$ is a linear $C_{12}$, $C_{14}$, $C_{16}$, or $C_{18}$ alkenyl.

In various embodiments, $R_1$ is derived from a fatty alcohol or polyol.

As noted, in Formula (I), $A^-$ is a counter-ion having a sulfonic acid moiety. In some embodiments, the counter-ion having the sulfonic acid moiety has the formula $R_2SO_3^-$ where $R_2$ is a substituted or unsubstituted alkyl, substituted or unsubstituted alkenyl, substituted or unsubstituted aryl, substituted or unsubstituted alkaryl, or substituted or unsubstituted heterocyclic ring. In certain embodiments, $R_2$ is alkyl, alkenyl, aryl, alkaryl, or heterocyclic ring substituted with one or more alkyl, alkenyl, hydroxyl, oxo, alkoxy, and/or cycloalkyl moieties.

In various embodiments, $R_2$ is an alkyl. In certain embodiments, $R_2$ is a $C_1$ to $C_{20}$, $C_1$ to $C_{12}$, $C_1$ to $C_{10}$, $C_1$ to $C_8$, $C_1$ to $C_6$, $C_1$ to $C_5$, $C_1$ to $C_4$, $C_1$ to $C_3$, $C_1$ to $C_2$, $C_2$ to $C_{12}$, $C_2$ to $C_{20}$, $C_2$ to $C_{10}$, $C_2$ to $C_8$, $C_2$ to $C_6$, $C_2$ to $C_5$, $C_2$ to $C_4$, or $C_2$ to $C_3$ alkyl. In some embodiments, $R_2$ is a $C_{12}$, $C_{10}$, $C_8$, $C_6$, $C_5$, $C_4$, $C_3$, $C_2$, or $C_1$ alkyl. In some embodiments, $R_2$ are methyl or ethyl.

In various embodiments, $R_2$ is an alkenyl. In certain embodiments, $R_2$ is a $C_1$ to $C_{12}$, $C_1$ to $C_{10}$, $C_1$ to $C_8$, $C_1$ to $C_6$, $C_1$ to $C_5$, $C_1$ to $C_4$, $C_1$ to $C_3$, $C_1$ to $C_2$, $C_2$ to $C_{12}$, $C_2$ to $C_{10}$, $C_2$ to $C_8$, $C_2$ to $C_6$, $C_2$ to $C_5$, $C_2$ to $C_4$, or $C_2$ to $C_3$ alkenyl. In some embodiments, $R_2$ is a $C_{12}$, $C_{10}$, $C_8$, $C_6$, $C_5$, $C_4$, $C_3$, $C_2$, or $C_1$ alkenyl.

In various embodiments, $R_2$ is aryl or alkaryl. For example in some embodiments, $R_2$ is phenyl or methylphenyl.

In certain embodiments, the counter-ion having the sulfonic acid moiety of Formula (I) is mesylate, esylate, besylate, or tosylate.

In certain embodiments, the compound of Formula (I) is lauryl tranexamate mesylate, lauryl tranexamate esylate, lauryl tranexamate besylate, lauryl tranexamate tosylate, myristyl tranexamate mesylate, myristyl tranexamate esylate, myristyl tranexamate besylate, myristyl tranexamate tosylate, cetyl tranexamate mesylate, cetyl tranexamate esylate, cetyl tranexamate besylate, cetyl tranexamate tosylate, stearyl tranexamate mesylate, stearyl tranexamate esylate, stearyl tranexamate besylate, or stearyl tranexamate tosylate.

Other aspects include processes for synthesizing the compounds of formula (I), as described herein. In various embodiments, the processes comprises contacting tranexamic acid with an alcohol comprising the moiety of $R^1$ and a sulfonic acid comprising the ion of $A^-$ to form the compound. Typically, the process is conducted under condition to remove water generated by esterification. Also, in some embodiments, the alcohol comprises a fatty alcohol.

The compounds of formula (I) can be synthesized by batch or continuous esterification procedures known in the art. For example, raw material may be added to a glass reaction vessel that has vapor column and total condenser, and is preferably purged with nitrogen, and the raw materials are heated to initiate the reaction and evaporate water produced by the reaction. Tranexamic acid and an alcohol (e.g., long chain alcohol or fatty alcohol) may be added to a reaction vessel, heated to 80° C., and then the sulfonic acid solution may be added slowly over a period of several minutes. However, reactants can be added in any order. The mixture can then be further heated to, for example, 140° C. and held for 12-24 hours to complete the reaction and evaporate all water. Post processing can include neutralization of any excess acid, further drying, flaking, and washing out of any excess residual raw materials with a solvent, such as ethanol or methanol. This reaction may be carried out with equal molar ratios of the three reactants: tranexamic acid, alcohol, and the sulfonic acid. Reaction efficiency can also be increased by using a slight molar excess of the alcohol. For example, the reaction can be carried out with a molar ratio of alcohol to tranexamic acid that is from 1.01:1 to 1:1.6.

Compositions

Additional aspects of the present invention include various compositions comprising one or more salts of tranexamic acid esters, such as a compound of formula (I), as described herein. In some embodiments, the composition is a topical skin care composition.

In various embodiments, the present invention are directed to compositions comprising a compound of formula (I), as described herein, and water. In some embodiments, the composition is homogenously dissolved or dispersed in the water. The water can be distilled water, purified water, spring water, coconut water, thermal water, alkaline water, infused water and/or drinking water.

In various embodiments, the composition has a concentration of water that is about 10 wt. % or greater, about 20 wt. % or greater, about 30 wt. % or greater, about 40 wt. % or greater, about 50 wt. % or greater, about 60 wt. % or greater, about 70 wt. % or greater, about 80 wt. % or greater, or about 90 wt. % or greater. In various embodiments, the composition has a concentration of water that is from about 10 wt. % to about 95 wt. %, from about 10 wt. % to about 90 wt. %, from about 10 wt. % to about 80 wt. %, from about 10 wt. % to about 70 wt. %, from about 10 wt. % to about 60 wt. %, from about 10 wt. % to about 50 wt. %, from about 10 wt. % to about 40 wt. %, from about 10 wt. % to about 30 wt. %, from about 10 wt. % to about 20 wt. %, from about 20 wt. % to about 95 wt. %, from about 20 wt. % to about 90 wt. %, from about 20 wt. % to about 80 wt. %, from about 20 wt. % to about 70 wt. %, from about 20 wt. % to about 60 wt. %, from about 20 wt. % to about 50 wt. %, from about 20 wt. % to about 40 wt. %, from about 20 wt. % to about 30 wt. %, from about 30 wt. % to about 95 wt. %, from about 30 wt. % to about 90 wt. %, from about 30 wt. % to about 80 wt. %, from about 30 wt. % to about 70 wt. %, from about 30 wt. % to about 60 wt. %, from about 30 wt. % to about 50 wt. %, or from about 30 wt. % to about 40 wt. %.

In various embodiments, the composition has a concentration of the compound (i.e., of formula (I)) that is about 50 wt. % or less, about 40 wt. % or less, about 30 wt. % or less, about 20 wt. % or less, about 10 wt. % or less, about 5 wt. % or less, or about 1 wt. % or less. In some embodiments, the composition has a concentration of the compound that is from about 0.001 wt. % to about 50 wt. %, from about 0.001 wt. % to about 40 wt. %, from about 0.001 wt. % to about 30 wt. %, from about 0.001 wt. % to about 20 wt. %, from about 0.001 wt. % to about 10 wt. %, from about 0.001 wt. % to about 5 wt. %, from about 0.01 wt. % to about 50 wt. %, from about 0.01 wt. % to about 40 wt. %, from about 0.01 wt. % to about 30 wt. %, from about 0.01 wt. % to about 20 wt. %, from about 0.1 wt. % to about 10 wt. %, from about 0.1 wt. % to about 5 wt. %, from about 0.1 wt. % to about 50 wt. %, from about 0.1 wt. % to about 40 wt. %, from about 0.1 wt. % to about 30 wt. %, from about 0.1 wt. % to about 20 wt. %, from about 0.1 wt. % to about 10 wt. %, from about 0.1 wt. % to about 5 wt. %, from about 1 wt. % to about 50 wt. %, from about 1 wt. % to about 40 wt. %, from about 1 wt. % to about 30 wt. %, from about 1 wt. % to about 20 wt. %, from about 1 wt. % to about 10 wt. %, or from about 1 wt. % to about 5 wt. %. For example, the composition can have a concentration of the compound that is from about 0.001 wt. % to about 11 wt. % or from about 0.5 wt. % to about 6 wt. %.

In various embodiments, the composition has a concentration of the compound that is at or near the solubility limit of the compound in the composition at 25° C.

In some embodiments, the composition has a pH that is about 6.5 or less, about 6 or less, about 5 or less, about 4 or less, or about 3 or less. In various embodiments, the composition has a pH that is from about 2 to about 6, from about 2 to about 5, from about 2 to about 4, from about 3 to about 6, from about 3 to about 5, from about 3 to about 4, from about 4 to about 6, or from about 4 to about 5.

In various embodiments, the composition further comprises one or more additional ingredients. The one or more additional ingredients can be one or more cosmetically acceptable ingredients. Examples of cosmetically acceptable ingredients are those listed in the International Cosmetic Ingredient Dictionary and Handbook, or in the United States Pharmacopeia.

In some embodiments, the one or more additional ingredients can comprise an organic acid and/or derivatives thereof. For example, the one or more additional ingredients can comprise at least one organic acid and/or derivative thereof selected from the group consisting of ascorbic acid, 3-o-ethyl ascorbic acid, azelaic acid, ellagic acid, kojic acid, mandelic acid, alpha-hydroxy acids, beta-hydroxy acids, fruit acids, and combinations thereof.

In some embodiments, the one or more additional ingredients can comprise a tyrosinase inhibitor.

In various embodiments, the one or more additional ingredients can comprise gluconolactone, heparan sulfate, arbutin, niacinamide, resveratrol, hydroquinone, and/or a peroxide.

In further embodiments, the one or more additional ingredients can comprise an exfoliant.

In certain embodiments, the one or more additional ingredients can comprise a coal tar, aloe vera gel, a keratolytic agent, a plant extract, a marine extract, a ferment extract, an isoflavone, a peptide, retinol, other retinoid, and/or combinations thereof.

In various embodiments, the one or more additional ingredients can comprise an alcohol. For example, the one or more additional ingredients can comprise at least one alcohol selected from the group consisting of glycerin, ethylhexylglycerin, propanediol, phenoxyethanol, and combinations thereof.

In certain embodiments, the one or more additional ingredients can comprise a polysaccharide and/or natural gum.

In some embodiments, the one or more additional ingredients can comprise a preservative.

In further embodiments, the one or more additional ingredients can comprise a lipid. For example, the one or more additional ingredients can comprise a glycolipid. For example, the one or more additional ingredients can comprise a sophorolipid (e.g., ACS SOPHOR).

In some embodiments, the one or more additional ingredients can comprise a starch. For example, the one or more additional ingredients can comprise potato starch.

In certain embodiments, the one or more additional ingredients can comprise polyglyceryl-6 esters.

In various, the one or more additional ingredients comprises a penetration enhancer. Examples of penetration enhancers include isosorbide esters, glyceryl mono esters, $C_3$ to $C_{10}$ glycols, and compounds such as capryloyl salicylic acid.

In various embodiments, the composition comprises an aqueous phase comprising the compound and an oil phase comprising at least one lipophilic component. The lipophilic component can comprise a monoglyceride, diglyceride, triglyceride, and/or a fatty alcohol. For example, the lipophilic component can comprise a glyceryl stearate, cetearyl alcohol, and/or capric triglyceride.

Further aspects include processes for producing the composition comprising a compound of formula (I), as described herein, and water. In various embodiments, the processes comprise combining the water with the compound of formula (I).

In various embodiments, the process further comprises adjusting the pH of the composition to about 6.5 or less, about 6 or less, about 5 or less, about 4 or less, or about 3 or less. For example, the process can comprise adjusting the pH of the composition in the range of from about 2 to about 6, from about 2 to about 5, from about 2 to about 4, from about 3 to about 6, from about 3 to about 5, from about 3 to about 4, from about 4 to about 6, or from about 4 to about 5. For example, the process can comprise adjusting the pH of the mixture to about 5.

In various embodiments, the process further comprises heating the compound and water. In some embodiments, the compound and water can be heated to a temperature of about 70° C. or greater, about 75° C. or greater, about 80° C. or greater, about 85° C. or greater, or about 90° C. or greater. In other embodiments, the compound and water is heated to a temperature of from about 70° C. to about 95° C., from about 70° C. to about 90° C., from about 70° C. to about 85° C., from about 75° C. to about 95° C., from about 75° C. to about 90° C., from about 75° C. to about 85° C., from about 77° C. to about 95° C., from about 77° C. to about 92° C., from about 77° C. to about 90° C., or from about 75° C. to about 85° C. For example, the compound and water can be heated to about the melting temperature of the compound.

Additional ingredients can be combined with the compound, water, or any mixture thereof.

Methods of Use

Further aspects include methods for treating an external surface (e.g., skin, hair, fingernails, etc.) of a subject using the compounds and compositions described herein. In various embodiments, methods for treating an external surface of a subject comprise applying to an external surface of the subject an effective amount of (a) the compound of formula (I) as described herein or (b) the composition comprising a compound of formula (I) and water, as described herein.

In some embodiments, the external surface comprises skin. In various embodiments, the method can be used for treating or reducing hyperpigmentation, aging spots, discoloration spots, redness, blemishes, fine lines, and/or wrinkles of the skin.

In further embodiments of the method, the compound or composition comprising the compound is applied to an external surface of the subject at least one time per day, at least two times per day, at least three times per day, at least four times per day, from about one to three times per day, from about one to two times per day, or one time per day.

DEFINITIONS

The term "substituted" as used herein, refers to chemically acceptable functional substituent groups, preferably moieties that does not negate the activity of the compounds. Such substituents include, but are not limited to alkyl groups, alkenyl groups, hydroxy groups, oxo groups, alkoxy groups, and/or cycloalkyl groups.

As used herein, the term "hydrocarbyl" refers to hydrocarbyl moieties, unless otherwise specified, preferably containing, 1 to about 50 carbon atoms, preferably 1 to about 30 carbon atoms, and even more preferably 1 to about 18 carbon atoms, including branched or unbranched, and saturated or unsaturated species. Hydrocarbyl groups can be selected from the group consisting of alkyl, alkenyl, alkoxy, alkylamino, thioalkyl, haloalkyl, cycloalkyl, cycloalkylalkyl, heterocyclyl, N-heterocyclyl, heterocyclylalkyl, aryl, aralkyl heteroaryl, N-heteroaryl, heteroarylalkyl, and the like. A hydrocarbyl may be optionally substituted hydrocarbyl. Hence, various hydrocarbyls can be further selected from substituted alkyl (e.g., cyano), substituted cycloalkyl and the like.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups can be unsubstituted or substituted by one or more suitable substituents, as defined above.

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "alkylaryl" or "alkaryl" as used herein, refers to an aryl group substituted by one or more alkyl groups and optionally substituted by one or more suitable substituents, as defined above.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "heterocycle," as used herein, refers to a monocyclic, bicyclic, or tricyclic group containing 1 to 4 heteroatoms selected from N, O, S(O)n, P(O)n, PRz, NH or NRz, wherein Rz is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholinyl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups can be unsubstituted or substituted by one or more suitable substituents, preferably 1 to 3 suitable substituents, as defined above.

The term "hydroxy," as used herein, refers to an —OH group.

The term "oxo," as used herein, refers to a double bonded oxygen (=O) radical wherein the bond partner is a carbon atom. Such a radical can also be thought as a carbonyl group.

Having described the invention in detail, it will be apparent that modifications and variations are possible without departing from the scope of the invention defined in the appended claims.

EXAMPLES

The following non-limiting examples are provided to further illustrate the present invention.

Examples 1-6. Freeze Stability of Compositions of Tranexamate Ester Salts with Differing Counter-Ions Cetyl tranexamate mesylate was prepared by adding cetyl alcohol and tranexamic acid to a glass reaction vessel at a molar ratio of 1.1:1, heating to 80° C., and further adding methanesulfonic acid (anhydrous) slowing over 30 minutes in a quantity that was equal molar to the tranexamic acid quantity. The mixture was heated to 140° C. and this temperature was maintained to remove water generated during the reaction.

Compositions of different tranexamate ester salts with differing counter-ions as shown in Table 1 were prepared as follows: 1) Ingredients A to D were combined based on the weight ratios in Table 1. 2) The mixture was heated with stirring to 80±5° C. until all solids were dissolved. 3) The homogeneous mixture was removed from the heat and allowed to cool to room temperature (25±5° C.). 4) Examples 3-6 had the pH adjusted to 5.0±0.3 with either aqueous NaOH or HCl, 10 wt. %, at room temperature.

TABLE 1

| | wt. % | | | | | |
|---|---|---|---|---|---|---|
| Ingredients | Example 1 | Example 2 | Example 3 | Example 4 | Example 5 | Example 6 |
| A. Cetyl tranexamate hydrochloride | 2.0 | — | 2.0 | — | 3.0 | — |
| B. Cetyl tranexamate mesylate | — | 2.0 | — | 2.0 | — | 3.0 |
| C. Distilled Water | qsp 100.0 | qsp 100.0 | qsp 100.0 | qsp 100.0 | qsp 100.0 | qsp 100.0 |
| D. NaOH 10 wt. % (aqueous, pH adjuster) | — | — | qsp pH 5.0 ± 0.3 | qsp pH 5.0 ± 0.3 | qsp pH 5.0 ± 0.3 | qsp pH 5.0 ± 0.3 |
| Total | 100.0 | 100.0 | 100.0 | 100.0 | 100.0 | 100.0 |
| Final pH | 3.4 | 2.2 | 5.0 | 5.0 | 5.2 | 5.1 |

Examples 1-6 were subjected to freezing temperatures for 12 hours (−9±5° C.), followed by thawing to and storage at room temperature. Stability was studied by visual inspection at 24 hours, 7 days, 14 days, and 30 days. The results are summarized in Table 2. Examples 1, 3, and 5 were not stable and presented floating brown particles not homogeneously dispersed. See FIG. 1. Examples 2, 4, and 6 were consistently stable and homogeneous, and did not form aggregates or precipitated crystals (FIG. 1). Furthermore, Examples 2, 4, and 6 did not require any additional stabilizer ingredients. Examples 2, 4, and 6 provided a smooth and refreshing feeling on use, and had a texture that was free from unfavorable grainy, sticky, or oily feel or after-feel.

Examples 7-12. Stability of Tranexamate Sulfonate Salts Compositions

Compositions of tranexamate sulfonate salts as shown in Table 3 were prepared as follows to test for shelf-life stability at room temperature and at 45±5° C. 1) Ingredients A and B were combined based on the weight ratios in Table 3. 2) The mixture was heated with stirring to 80±5° C. until all solids were dissolved. 3) The homogeneous mixture was removed from the heat and allowed to cool to room temperature (25±5° C.).

TABLE 3

| | Room temperature (wt. %) | | | 45 ± 5° C. (wt. %) | | |
|---|---|---|---|---|---|---|
| Ingredients | Example 7 | Example 8 | Example 9 | Example 10 | Example 11 | Example 12 |
| A. Cetyl tranexamate mesylate | 0.5 | 2.5 | 5.0 | 0.5 | 2.5 | 5.0 |
| B. Distilled Water | qsp 100.0 | qsp 100.0 | qsp 100.0 | qsp 100.0 | qsp 100.0 | qsp 100.0 |
| Total | 100.0 | 100.0 | 100.0 | 100.0 | 100.0 | 100.0 |

After 24 hours storage at room temperature, Examples 10-12 were transferred to a lab oven at 45±5° C., while Examples 7-9 remained at room temperature. Stability was studied by visual inspection after an additional 24 hours, 7 days, 14 days, 30 days, and 60 days storage either at room temperature or in the oven. The results are summarized in Table 4. Examples 7-12 were consistently stable and homogeneous, and did not form aggregates or precipitated crystals. Furthermore, Examples 7-12 did not require any additional stabilizer ingredients. Examples 7-12 were all equally homogeneous. The compositions were more opaque at higher concentrations of tranexamate sulfonate salt. Examples 7-12 provided a smooth and refreshing feeling on use, and had a texture that was free from unfavorable grainy, sticky, or oily feel or after-feel.

TABLE 2

| | Visual Inspection | | | |
|---|---|---|---|---|
| | 24 h | Day 7 | Day 14 | Day 30 |
| Example 1 | not homogeneous, floating brown particles | not homogeneous, floating brown particles | not homogeneous, floating brown particles | not homogeneous, floating brown particles |
| Example 2 | homogeneous, white pearlescent dispersion | homogeneous, white pearlescent dispersion | homogeneous, white pearlescent dispersion | homogeneous, white dispersion |
| Example 3 | not homogeneous, floating brown particles | not homogeneous, floating brown particles | not homogeneous, floating brown particles | not homogeneous, floating brown particles |
| Example 4 | homogeneous, white pearlescent dispersion | homogeneous, white dispersion | homogeneous, white dispersion | homogeneous, white dispersion |
| Example 5 | not homogeneous, floating brown particles | not homogeneous, floating brown particles | not homogeneous, floating brown particles | not homogeneous, floating brown particles |
| Example 6 | homogeneous, white pearlescent dispersion | homogeneous, white dispersion | homogeneous, white dispersion | homogeneous, white dispersion |

TABLE 4

| | Visual Inspection | | | | |
|---|---|---|---|---|---|
| | 24 h | Day 7 | Day 14 | Day 30 | Day 60 |
| Example 7 | translucent, pearlescent, homogeneous dispersion | same as at 24 hours | opaque, pearlescent, homogeneous dispersion | same as at day 14 | same as at day 14 |
| Example 8 | opaque, pearlescent, homogeneous dispersion | same as at 24 hours | same as at 24 hours | same as at 24 hours | same as at 24 hours |
| Example 9 | opaque, pearlescent, homogeneous dispersion | same as at 24 hours | same as at 24 hours | same as at 24 hours | same as at 24 hours |
| Example 10 | translucent, pearlescent, homogeneous dispersion | same as at 24 hours | same as at 24 hours | same as at 24 hours | same as at 24 hours |
| Example 11 | opaque, pearlescent, homogeneous dispersion | same as at 24 hours | same as at 24 hours | same as at 24 hours | same as at 24 hours |
| Example 12 | opaque, pearlescent, homogeneous dispersion | same as at 24 hours | same as at 24 hours | same as at 24 hours | same as at 24 hours |

Examples 13-16. Viscosity of Compositions of Tranexamate Ester Salts with Differing Counter-Ions Compositions of tranexamate ester salts with differing counter-ions as shown in Table 5 were prepared as follows. 1) Ingredients A to C were combined based on the weight ratios in Table 5. 2) The mixture was heated with stirring to 80±5° C. until all solids were dissolved. 3) The homogeneous mixture was removed from the heat and allowed to cool to room temperature (25±5° C.).

TABLE 5

| | wt. % | | | |
|---|---|---|---|---|
| Ingredients | Example 13 | Example 14 | Example 15 | Example 16 |
| A. Cetyl tranexamate hydrochloride | 1.0 | 5.0 | — | — |
| B. Cetyl tranexamate mesylate | — | — | 1.0 | 5.0 |
| C. Distilled Water | qsp 100.0 | qsp 100.0 | qsp 100.0 | qsp 100.0 |
| Total | 100.0 | 100.0 | 100.0 | 100.0 |

The viscosity at room temperature (25±1° C.) of Examples 13-16 was determined by the method of the vertical falling sphere using the equation $\mu = [2 (\rho_s - \rho_l) g a^2]/9v$, where $\mu$=dynamic viscosity, $\rho_s$=density of the sphere, $\rho_l$=density of the test material (Examples 13-16), g=standard gravity, a=radius of the sphere, and v=velocity of the sphere.

Figure 2:
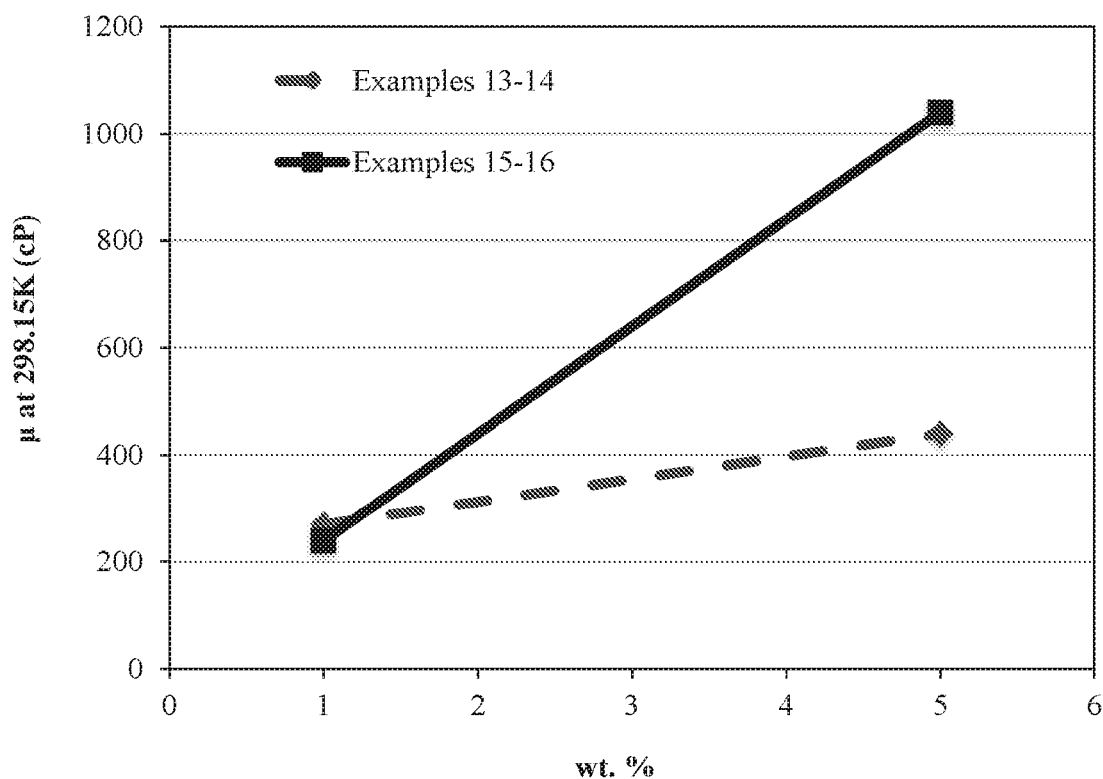
FIG. 2 presents a graph showing viscosity of compositions containing salts of tranexamic acid esters.

Results are represented in FIG. 2. Compared to the tranexamate hydrochloride salt, the tranexamate sulfonate salt yielded higher viscosity with increasing concentration. Additionally, the tranexamate sulfonate salt yielded stable and homogeneous compositions not observed with the tranexamate hydrochloride salt (see Examples 1 to 12). Viscosity may have been one of the forces contributing to the higher stability, but surprisingly viscosity did not fully explain the phenomenon as the tranexamate sulfonate salt also resulted in stable compositions at low viscosity.

Examples 17. Lightening Serum with Tranexamate Sulfonate Salt

Example 17, a lightening serum as shown in Table 6, was prepared as follows. 1) Ingredients 1 and 2 were combined based on the weight ratios in Table 6. 2) The mixture was mixed and heated to 80±5° C. until all solids were dissolved. 3) Ingredients 3-6 were combined with each other and ingredient 7 was dispersed in them, and ingredients 3-7 were added to ingredients 1-2 with stirring at 80±5° C. 4) The oil phase ingredients 8-10 were combined with each other, heated to 80±5° C. until melted, and added to ingredients 1-7 with mixing at high speed (600-1200 rpm) at 80±5° C. 5) The composition was removed from the heat and kept mixing at low speed (<500 rpm) while allowing to cool to room temperature.

Example 17 provided a smooth and refreshing feeling on use and had a hydrating, light serum texture free from unfavorable grainy, sticky, or oily feel or after-feel. It may be used to moisturize and inhibit hyperpigmentation of the skin, as well as to reduce aging spots, discoloration spots, redness, blemishes, fine lines, and wrinkles. The stability was followed by visual inspection and the results are summarized in Table 9. Example 17 showed no signs of deterioration or separation after 60 days.

TABLE 6

| Example 17-Lightening Serum | | |
|---|---|---|
| Phase | Ingredients | wt. % |
| Water Phase | 1. Distilled water | qs |
| | 2. Cetyl tranexamate mesylate | 2.0 |
| | 3. Glycerin | 2.0 |
| | 4. Propanediol | 2.0 |
| | 5. Phenoxyethanol | 1.0 |
| | 6. Ethylhexylglycerin | 0.2 |

TABLE 6-continued

| | Example 17-Lightening Serum | |
|---|---|---|
| Phase | Ingredients | wt. % |
| Oil Phase | 7. Tamarind Gum | 1.0 |
| | 8. Glyceryl Stearate | 1.0 |
| | 9. Cetearyl Alcohol | 2.0 |
| | 10. Caprylic/Capric Triglyceride | 5.0 |
| | Total | 100.0 |

Example 18. Aqueous Toner with Tranexamate Sulfonate Salt

Example 18, an aqueous toner as shown in Table 7, was prepared as follows. 1) Ingredients 1-2 were combined based on the weight ratios in Table 7. 2) The mixture was heated with stirring to 80±5° C. until all solids were dissolved. 3) The homogenous mixture was removed from the heat, kept stirring, and allowed to cool to room temperature. 4) Ingredients 3-6 were added to ingredients 1-2 with stirring at room temperature. 5) Ingredients 7-8 were added with stirring at room temperature. 6) The pH was adjusted to 4.5±0.3 with ingredient 9.

Example 18 provided a smooth and refreshing feeling on use and had a hydrating, light serum texture free from unfavorable grainy, sticky, or oily feel or after-feel. It may be used to gently cleanse and hydrate skin, promote an even skin complexion, and inhibit hyperpigmentation of the skin, as well as to reduce aging spots, discoloration spots, redness, blemishes, fine lines, and wrinkles. The stability was followed by visual inspection and the results are summarized in Table 9. It showed no signs of deterioration or separation after 60 days.

TABLE 7

| | Example 18-Aqueous Toner | |
|---|---|---|
| Phase | Ingredients | wt. % |
| Water Phase | 1. Spring water, thermal water, and/or distilled water | qs |
| | 2. Cetyl tranexamate mesylate | 2.0 |
| | 3. Propanediol | 4.0 |
| | 4. Glycerin | 4.0 |
| | 5. Preservative | 1.0 |
| | 6. Coal tar | 0.5 |
| | 7. Aloe vera gel | 2.0 |
| | 8. Sophorolipid (ACS SOPHOR) | 1.0 |
| | 9. NaOH 20 wt. % (aqueous, pH adjuster) | qsp pH 4.5 ± 0.3 |
| | Total | 100.0 |

Example 19. Aqueous Facial Mist with Tranexamate Sulfonate Salt

An aqueous facial mist as shown in Table 8, was prepared as follows. 1) Ingredients 1-2 were combined based on the weight ratios in Table 8. 2) The mixture was heated with stirring to 80±5° C. until all solids were dissolved. 3) The homogenous mixture was removed from the heat, kept stirring, and allowed to cool to room temperature. 4) Ingredients 3-6 were added to ingredients 1-2 and mixed at room temperature. 5) Ingredient 7 was added at room temperature. 6) The pH was adjusted to 5.0±0.3 with ingredient 8. 7) The aqueous facial mist was packed into a sprayer bottle.

Example 19 provided a smooth and refreshing feeling on use and had a hydrating, light serum texture free from unfavorable grainy, sticky, or oily feel or after-feel. It may be used to moisturize and inhibit hyperpigmentation of the skin, as well as to reduce aging spots, discoloration spots, redness, blemishes, fine lines, and wrinkles. The stability of Example 19 was followed by visual inspection and the results are summarized in Table 9. It showed no signs of deterioration or separation after 60 days.

TABLE 8

| | Example 19-Aqueous Facial Mist | |
|---|---|---|
| Phase | Ingredients | wt. % |
| Water Phase | 1. Coconut water and/or distilled water | qs |
| | 2. Cetyl tranexamate mesylate | 2.0 |
| | 3. Glycerin | 6.0 |
| | 4. Polyglyceryl-6 esters | 1.0 |
| | 5. Preservative | 1.5 |
| | 6. Sophorolipid | 1.0 |
| | 7. Fermented red willow extract (SALIXIN Organic Extract 800 NP) | 0.5 |
| | 8. NaOH 20 wt. % (aqueous, pH adjuster) | qsp pH 5.0 ± 0.3 |
| | Total | 100.0 |

In summary, Examples 17-19 were consistently stable and homogeneous, and did not aggregate, precipitate, or crystalize at room temperature or at 45±5° C. Examples 17-19 further corroborate that the tranexamate sulfonate salts described herein can efficiently be employed in the production of stable compositions with a refreshing smooth feel and after-feel.

TABLE 9

| | Visual Inspection-room temperature (25 ± 5° C.) | | | | |
|---|---|---|---|---|---|
| | 24 h | Day 7 | Day 14 | Day 30 | Day 60 |
| Example 17 | homogeneous, opaque lotion | same as at 24 hours | same as at 24 hours | same as at 24 hours | same as at 24 hours |
| Example 18 | homogeneous, opaque solution | same as at 24 hours | same as at 24 hours | same as at 24 hours | same as at 24 hours |
| Example 19 | homogeneous, opaque gel | same as at 24 hours | same as at 24 hours | same as at 24 hours | same as at 24 hours |

TABLE 9-continued

| | Visual Inspection-lab oven (45 ± 5° C.) | | | | |
|---|---|---|---|---|---|
| | 24 h | Day 7 | Day 14 | Day 30 | Day 60 |
| Example 17 | homogeneous, opaque lotion | same as at 24 hours | same as at 24 hours | same as at 24 hours | same as at 24 hours |
| Example 18 | homogeneous, opaque solution | same as at 24 hours | same as at 24 hours | same as at 24 hours | same as at 24 hours |
| Example 19 | homogeneous, opaque gel | same as at 24 hours | same as at 24 hours | same as at 24 hours | same as at 24 hours |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions, methods, and processes without departing from the scope of the invention, it is intended that all matter contained in the above description and shown in the accompanying drawings shall be interpreted as illustrative and not in a limiting sense.

The invention claimed is:

1. A compound of formula (I):

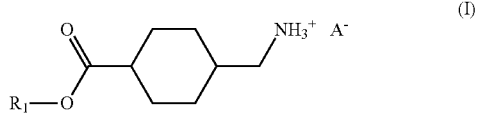

wherein $R_1$ is a saturated or unsaturated, substituted or unsubstituted aliphatic hydrocarbyl and $A^-$ is a counter-ion having a sulfonic acid moiety.

2. The compound of claim 1, wherein $R_1$ is a saturated or unsaturated, aliphatic hydrocarbyl substituted with one or more alkyl, alkenyl, hydroxyl, oxo, alkoxy, and/or cycloalkyl moieties.

3. The compound of claim 1, wherein $R_1$ is alkyl or alkenyl.

4. The compound of claim 1, wherein $R_1$ is derived from a fatty alcohol or polyol.

5. The compound of claim 1, wherein $R_1$ is a $C_8$ to $C_{22}$ alkyl; $C_{10}$ to $C_{20}$ alkyl; $C_8$ to $C_{22}$ alkenyl; or $C_{10}$ to $C_{20}$ alkenyl.

6. The compound of claim 1, wherein the counter-ion having the sulfonic acid moiety has the formula $R_2SO_3^-$ where $R_2$ is a substituted or unsubstituted alkyl, substituted or unsubstituted alkenyl, substituted or unsubstituted aryl, substituted or unsubstituted alkaryl, or substituted or unsubstituted heterocyclic ring.

7. The compound of claim 6, wherein $R_2$ is methyl or ethyl.

8. The compound of claim 1, wherein the compound of formula (I) is lauryl tranexamate mesylate, lauryl tranexamate esylate, lauryl tranexamate besylate, lauryl tranexamate tosylate, myristyl tranexamate mesylate, myristyl tranexamate esylate, myristyl tranexamate besylate, myristyl tranexamate tosylate, cetyl tranexamate mesylate, cetyl tranexamate esylate, cetyl tranexamate besylate, cetyl tranexamate tosylate, stearyl tranexamate mesylate, stearyl tranexamate esylate, stearyl tranexamate besylate, or stearyl tranexamate tosylate.

9. The compound of claim 1, wherein the compound of formula (I) is cetyl tranexamate mesylate.

10. A composition comprising the compound of claim 1 and water, wherein the compound is homogeneously dispersed in the water.

11. The composition of claim 10, wherein the composition is a topical skin care composition.

12. The composition of claim 10, wherein the composition has a pH that is about 6.5 or less, about 6 or less, about 5 or less, about 4 or less, or about 3 or less.

13. The composition of claim 10, wherein the composition comprises an aqueous phase comprising the compound and an oil phase comprising at least one lipophilic component.

14. The composition of claim 13, wherein the lipophilic component comprises a monoglyceride, diglyceride, triglyceride, and/or a fatty alcohol.

15. A method for treating an external surface of a subject, the method comprising applying to an external surface of the subject an effective amount of the composition of claim 10, wherein the external surface comprises skin.

16. A process for preparing the composition of claim 10, the process comprising:

combining water with the compound of formula (I):

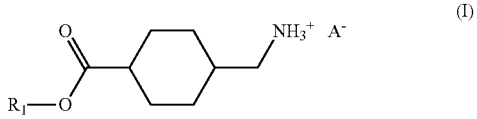

wherein $R_1$ is a saturated or unsaturated, substituted or unsubstituted aliphatic hydrocarbyl and $A^-$ is a counter-ion having a sulfonic acid moiety.

17. A process for synthesizing the compound of claim 1, the process comprising contacting tranexamic acid with an alcohol comprising the moiety of $R_1$ and a sulfonic acid comprising the ion of $A^-$ to form the compound.

18. The composition of claim 10, wherein the compound is 0.1% to 10% wt/wt of the composition.

19. The composition of claim 10, wherein said dispersion is stable at room temperature for at least 60 days.

20. The composition of claim 10, wherein said dispersion is stable at least 40° C. for at least 60 days.

* * * * *